United States Patent
Fletcher

(10) Patent No.: US 9,426,941 B2
(45) Date of Patent: Aug. 30, 2016

(54) MOWER ATTACHABLE USER COOLING DEVICE

(71) Applicant: Ken E. Fletcher, Jacksonville, AR (US)

(72) Inventor: Ken E. Fletcher, Jacksonville, AR (US)

(*) Notice: Subject to any disclaimer, the term of this patent is extended or adjusted under 35 U.S.C. 154(b) by 232 days.

(21) Appl. No.: 14/227,790

(22) Filed: Mar. 27, 2014

(65) Prior Publication Data

US 2015/0272005 A1 Oct. 1, 2015

(51) Int. Cl.
*A01D 75/00* (2006.01)
*A01D 34/82* (2006.01)

(52) U.S. Cl.
CPC ............. *A01D 75/00* (2013.01); *A01D 34/82* (2013.01)

(58) Field of Classification Search
CPC .............................. A01D 34/82; A01D 75/00
USPC .............. 261/30, 72.1, 84, DIG. 3, DIG. 43; 239/289, 379
See application file for complete search history.

(56) References Cited

U.S. PATENT DOCUMENTS

| | | | | |
|---|---|---|---|---|
| 2,966,046 A * | 12/1960 | Wright | ................. | B60N 3/104 261/29 |
| 5,159,819 A * | 11/1992 | Wong | ................. | F24F 5/0017 62/419 |
| 6,027,137 A * | 2/2000 | Rura | ................. | A47C 7/66 261/DIG. 3 |
| 6,145,288 A * | 11/2000 | Tamian | ................. | A01C 23/00 56/16.4 A |
| 6,237,896 B1 | 5/2001 | Hicks et al. | | |
| 6,325,362 B1 | 12/2001 | Massey et al. | | |
| 6,471,194 B2 | 10/2002 | Keeney | | |
| 6,543,247 B2 | 4/2003 | Strauss | | |
| 6,908,052 B1 * | 6/2005 | Jacobson | ................. | A01D 43/14 239/146 |
| 7,150,162 B1 | 12/2006 | Brunner | | |
| 7,188,489 B2 * | 3/2007 | Martello | ................. | B60H 1/005 62/420 |
| 7,805,958 B2 * | 10/2010 | Bratcher | ................. | B62B 9/00 62/420 |
| 7,823,865 B2 * | 11/2010 | Baldon | ................. | F24F 6/14 261/116 |
| 7,922,106 B2 | 4/2011 | Meadors, Jr. | | |
| 8,016,270 B2 | 9/2011 | Chen et al. | | |
| 8,051,904 B1 * | 11/2011 | Whiting | ................. | B60H 1/00264 165/202 |
| 8,297,695 B1 | 10/2012 | Aiken et al. | | |
| 2005/0150251 A1 * | 7/2005 | Navedo | ................. | F24F 5/0017 62/530 |

* cited by examiner

*Primary Examiner* — Charles Bushey
*Assistant Examiner* — Scott Bushey

(57) ABSTRACT

A mower attachable user cooling device cools a user of a mower while mowing in hot weather. The device includes a housing, the housing having a first face. A coupler is coupled to the housing wherein the housing is configured for being coupled to a mower such that the first face is directed facing a user of the mower. A fan vent extends through the first face. A fan is positioned in the housing directing air flow out of the fan vent towards the user of the mower.

12 Claims, 4 Drawing Sheets

MOWER ATTACHABLE USER COOLING DEVICE

BACKGROUND OF THE DISCLOSURE

Field of the Disclosure

The disclosure relates to cooling devices and more particularly pertains to a new cooling device for cooling a user outdoors in hot weather. An embodiment of the device may be used to cool a user of a mower while mowing in hot weather.

SUMMARY OF THE DISCLOSURE

An embodiment of the disclosure meets the needs presented above by generally comprising a housing, the housing having a first face. A coupler is coupled to the housing wherein the housing is configured for being coupled to a mower such that the first face is directed facing a user of the mower. A fan vent extends through the first face. A fan is positioned in the housing directing air flow out of the fan vent towards the user of the mower.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
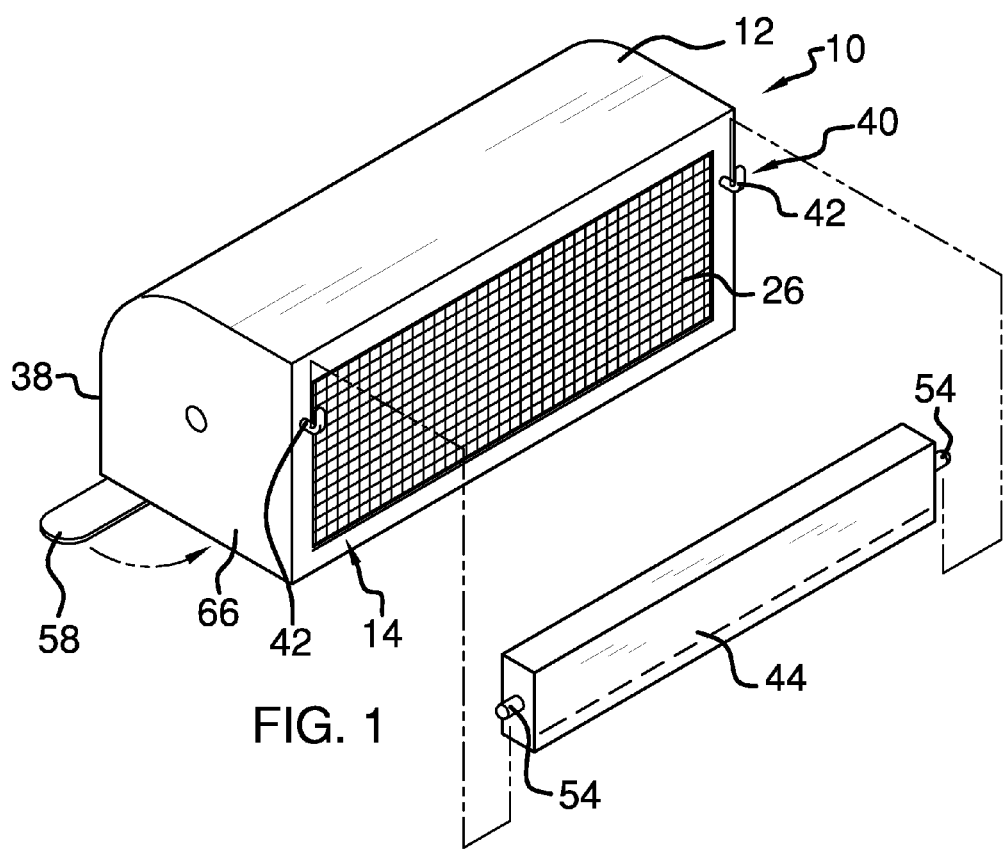
FIG. 1 is a partially exploded top side front perspective view of a mower attachable user cooling device according to an embodiment of the disclosure.
Figure 2:
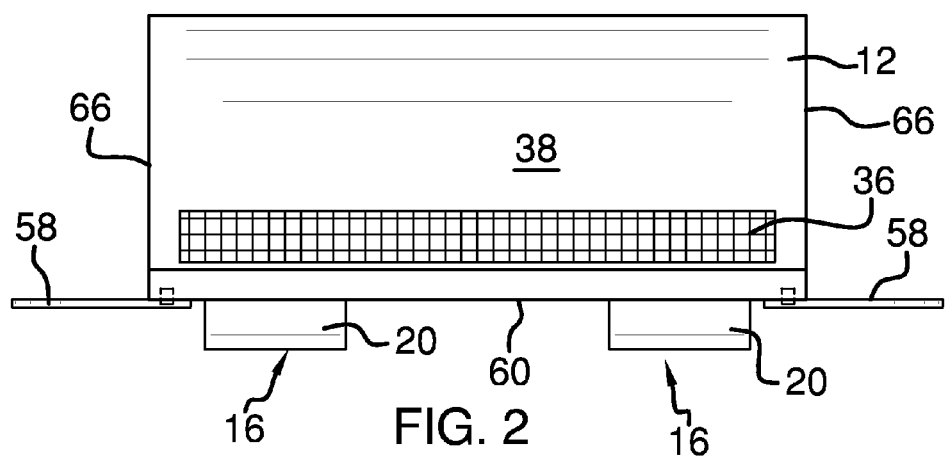
FIG. 2 is a back view of an embodiment of the disclosure.
Figure 3:
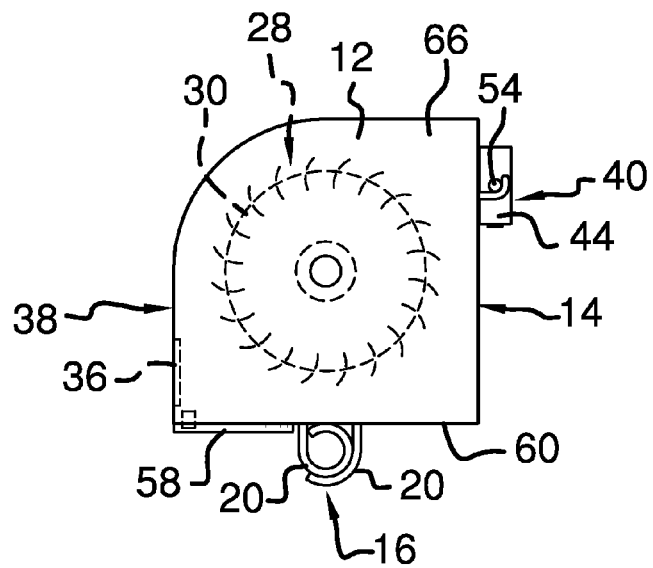
FIG. 3 is a side view of an embodiment of the disclosure.
Figure 4:
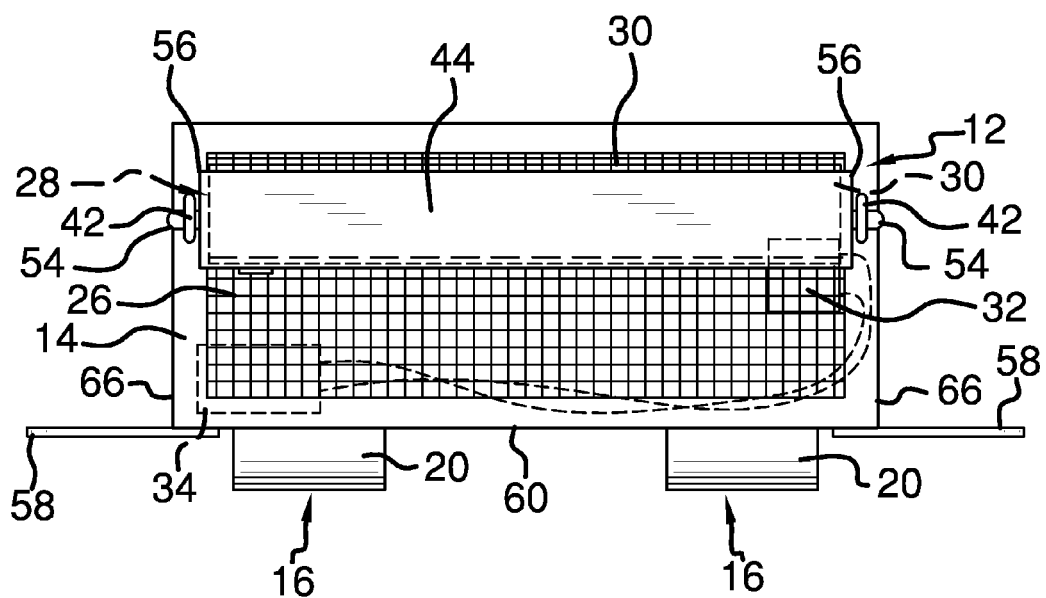
FIG. 4 is a front view of an embodiment of the disclosure.
Figure 5:
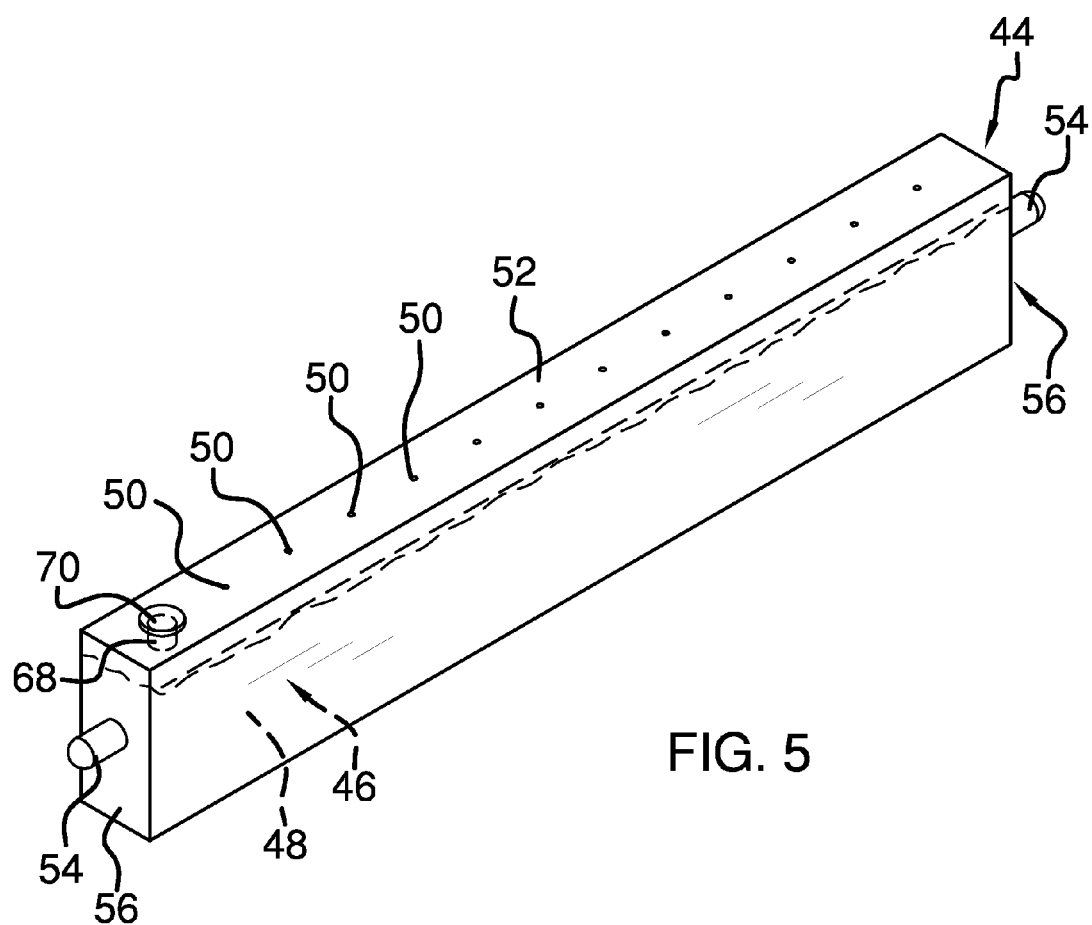
FIG. 5 is a top front side perspective view of a cooling tank of an embodiment of the disclosure.
Figure 6:
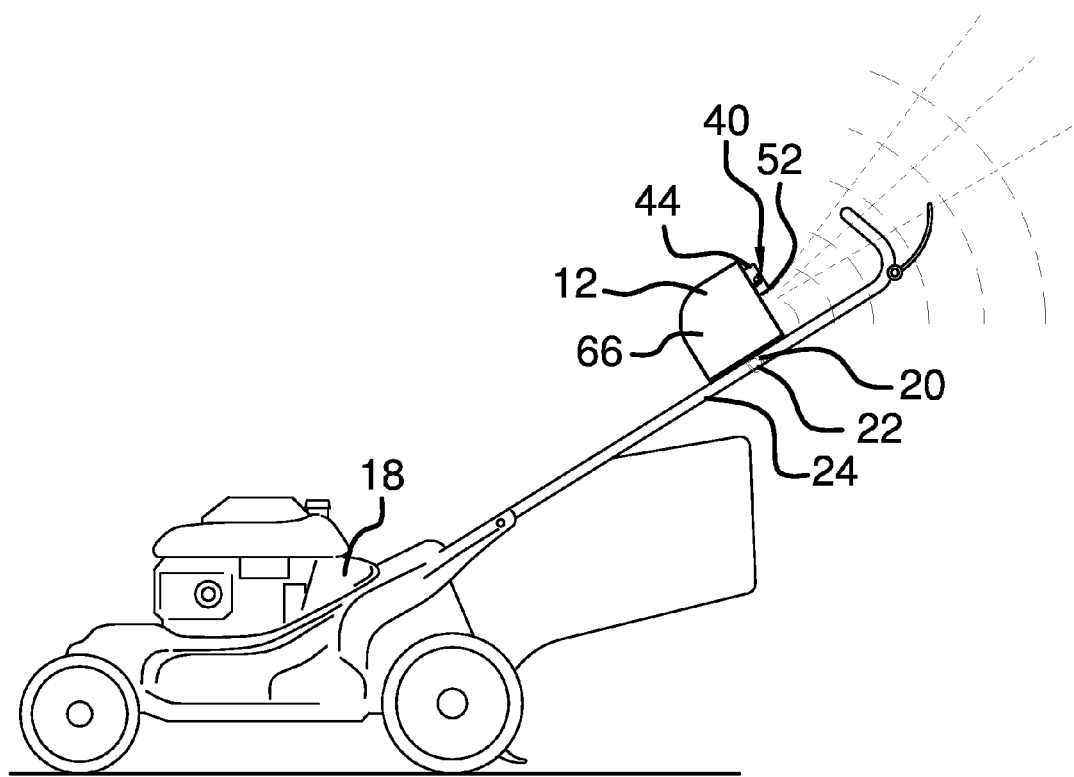
FIG. 6 is a side view of an embodiment of the disclosure in use.

With reference now to the drawings, and in particular to FIGS. 1 through 6 thereof, a new cooling device embodying the principles and concepts of an embodiment of the disclosure and generally designated by the reference numeral 10 will be described.

As best illustrated in FIGS. 1 through 6, the mower attachable user cooling device 10 generally comprises a housing 12 having a first face 14. A coupler 16 is coupled to the housing 12 wherein the housing 12 is configured for coupling to a mower 18 such that the first face 14 is directed facing a user of the mower 18. The coupler 16 may comprise a pair of straps 20 coupled to and extending from the housing 12. The straps 20 are engageable together wherein the straps 20 are configured for wrapping around and coupling the housing 12 to a bar 22 of a handle 24 of the mower 18.

A fan vent 26 extends through the first face 14. A fan 28 is positioned in the housing 12 directing air flow out of the fan vent 26 wherein the fan 28 is configured for directing air flow towards the user of the mower 18. The fan 28 comprises an impeller 30, a motor 32 operationally coupled to the impeller 30 for rotating the impeller 30, and a battery 34 electrically coupled to the motor 32. The battery 34 may be rechargeable. The fan 28 may have multiple speed settings. An intake vent 36 extends into the housing 12 wherein the fan 28 is configured for drawing ambient air into the housing 12 to be directed out of the fan vent 26. The intake vent 36 may be positioned on a second face 38 of the housing 12 opposite the first face 14. Each of a pair of plates 58 is extendable from the housing 12. The plates 58 are coplanar when extended from the housing 12 wherein the plates 58 are configured for supporting the housing 12 on the handle 24 of the mower 18. Each of the plates 58 is pivotally coupled to a base wall 60 of the housing 12. Each of the plates 58 is extendable outwardly relative to a respective end face 66 of the housing 12.

A mount 40 is coupled to the housing 12. The mount 40 is a pair of spaced brackets 42 extending outwardly from the housing 12. A cooling tank 44 has an interior space 46 configured for holding a freezable fluid 48 such as water. A fill opening 68 extends through the cooling tank 44 and may be sealed by a cap 70. The cooling tank 44 is couplable to the mount 40 wherein the cooling tank 44 is positioned to extend across the first face 14 of the housing 12 adjacent to or extending across the fan vent 26. Thus, the cooling tank 44 is configured to cool the air flow from the fan vent 26. To enhance cooling provided by the cooling tank 44, each of a plurality of apertures 50 extends through a wall 52 of the cooling tank 44. The apertures 50 are small to restrict flow through the apertures 50 to a desired rate. The apertures 50 are positioned on the wall 52 with the fill opening 68 to facilitate filling of the cooling tank 44 and allowing the cooling tank 44 to be positioned in a freezer with the wall 52 facing upwardly. The cooling tank 44 is couplable to the housing 12 such that the wall 52 of the tank 44 faces downwardly. Thus, as the freezable fluid 48 melts in the interior space 46, the freezable fluid 48 passes through the apertures 50. The apertures 50 are positioned relative to the fan vent 26 such that the apertures 50 deliver the freezable fluid 48 into the air flow from the fan vent 26 as the freezable fluid 48 melts and passes through the apertures 50. Each of a pair of projections 54 extends from the cooling tank 44. Each of the projections 54 is engaged and supported by an associated one of the brackets 42 wherein the cooling tank 44 is coupled to and supported in place relative to the housing 12. Each of the projections 54 extends from a respective end face 56 of the cooling tank 44. A pair of similarly structured cooling tanks 44 may be provided to allow for interchanging of an expended or warmed cooling tank 44 for another frozen cooling tank 44.

In use, the housing 12 is coupled to the handle 24 of the mower 18. The fan 28 is activated to provide air flow directed towards the user of the mower 18. To enhance cooling of the user, the cooling tank 44 may be filled with the freezable fluid 48 and placed into the freezer to freeze the freezable fluid 48 within the interior space 46 of the cooling tank 44. The cooling tank 44 is then inverted when coupled to the mount 40 wherein the freezable fluid 48 is dispensed into the air flow producing a cooling mist directed towards the user by the air flow. The device 10 may also be used without being coupled or attached to the mower 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mower attachable user cooling device comprising:
   a housing, said housing having a first face;
   a coupler coupled to said housing wherein said housing is configured for coupling to a mower such that said first face is directed facing a user of the mower;
   a fan vent extending through said first face;
   a fan positioned in said housing, said fan directing air flow out of said fan vent wherein said fan is configured for directing air flow towards the user of the mower;
   a mount coupled to said housing; and
   a cooling tank having an interior space configured for holding a freezable fluid, said cooling tank being couplable to said mount wherein said cooling tank is positioned to extend across said first face of said housing wherein said cooling tank is configured to cool the air flow from said fan vent.

2. The device of claim 1, further comprising an intake vent extending into said housing wherein said fan is configured for drawing ambient air into said housing to be directed out of said fan vent.

3. The device of claim 1, further comprising a plurality of apertures extending through a wall of said cooling tank, said cooling tank being couplable to said housing such that said wall of said tank faces downwardly wherein said freezable fluid passes through said apertures as said freezable fluid melts in said interior space of said cooling tank.

4. The device of claim 3, further comprising said apertures being positioned relative to said fan vent such that said apertures are configured for delivering the freezable fluid into the air flow from said fan vent as the freezable fluid melts and passes through the apertures.

5. The device of claim 1, further comprising:
   said mount being a pair of spaced brackets extending outwardly from said housing; and
   a pair of projections extending from said cooling tank, each of said projections being engaged and supported by an associated one of said brackets wherein said cooling tank is coupled to said housing.

6. The device of claim 5, further comprising each of said projections extending from a respective end face of said cooling tank.

7. The device of claim 1, further comprising said fan comprising an impeller, a motor operationally coupled to said impeller for rotating said impeller, and a battery electrically coupled to said motor.

8. The device of claim 1, further comprising:
   said coupler comprising a pair of straps coupled to and extending from said housing, said straps being engageable together wherein said straps are configured for wrapping around and coupling said housing to a bar of a handle of the mower;
   said fan comprising an impeller, a motor operationally coupled to said impeller for rotating said impeller, and a battery electrically coupled to said motor;
   an intake vent extending into said housing wherein said fan is configured for drawing ambient air into said housing to be directed out of said fan vent;
   said housing, said mount being a pair of spaced brackets extending outwardly from said housing;
   a plurality of apertures extending through a wall of said cooling tank, said cooling tank being couplable to said housing such that said wall of said tank faces downwardly wherein said freezable fluid passes through said apertures as said freezable fluid melts in said interior space of said cooling tank, said apertures being positioned relative to said fan vent such that said apertures are configured for delivering the freezable fluid into the air flow from said fan vent as the freezable fluid melts and passes through the apertures;
   a pair of projections extending from said cooling tank, each of said projections being engaged and supported by an associated one of said brackets wherein said cooling tank is coupled to said housing, each of said projections extending from a respective end face of said cooling tank; and
   a pair of plates, each of said plates being extendable from said housing, said plates being coplanar when extended from said housing wherein said plates are configured for supporting said housing on a handle of the mower, each of said plates being pivotally coupled to a base wall of said housing, each of said plates being extendable outwardly relative to a respective end face of said housing.

9. A mower attachable user cooling device comprising:
   a housing, said housing having a first face;
   a coupler coupled to said housing wherein said housing is configured for coupling to a mower such that said first face is directed facing a user of the mower;
   a fan vent extending through said first face;
   a fan positioned in said housing, said fan directing air flow out of said fan vent wherein said fan is configured for directing air flow towards the user of the mower; and
   a pair of straps coupled to and extending from said housing, said straps being engageable together wherein said straps are configured for wrapping around and coupling said housing to a bar of a handle of the mower.

10. A mower attachable user cooling device comprising:
    a housing, said housing having a first face;
    a coupler coupled to said housing wherein said housing is configured for coupling to a mower such that said first face is directed facing a user of the mower;
    a fan vent extending through said first face;
    a fan positioned in said housing, said fan directing air flow out of said fan vent wherein said fan is configured for directing air flow towards the user of the mower; and a pair of plates, each of said plates being extendable from said housing, said plates being coplanar when extended from said housing wherein said plates are configured for supporting said housing on a handle of the mower.

11. The device of claim 10, further comprising each of said plates being pivotally coupled to a base wall of said housing.

12. The device of claim 10, further comprising each of said plates being extendable outwardly relative to a respective end face of said housing.

* * * * *